United States Patent
Ochi et al.

(10) Patent No.: US 7,646,492 B2
(45) Date of Patent: Jan. 12, 2010

(54) OPTICAL MEASURING MACHINE

(75) Inventors: Kenji Ochi, Kure (JP); Naoya Kikuchi, Utsunomiya (JP); Shinji Takahashi, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 403 days.

(21) Appl. No.: 11/878,543

(22) Filed: Jul. 25, 2007

(65) Prior Publication Data
US 2008/0024791 A1    Jan. 31, 2008

(30) Foreign Application Priority Data
Jul. 27, 2006    (JP)    ............................. 2006-205243

(51) Int. Cl.
*G01B 11/24* (2006.01)
*G01B 11/14* (2006.01)
(52) U.S. Cl. ...................................... 356/601; 356/625
(58) Field of Classification Search ........................ None
See application file for complete search history.

(56) References Cited

U.S. PATENT DOCUMENTS 5,576,832 A * 11/1996 Yamamoto .................. 356/391
5,590,060 A    12/1996 Granville et al.

FOREIGN PATENT DOCUMENTS

| JP | A 3-35106 | 2/1991 |
|----|-----------|--------|
| JP | A 6-82218 | 3/1994 |

\* cited by examiner

*Primary Examiner*—Gregory J Toatley, Jr.
*Assistant Examiner*—Amanda H Merlino
(74) *Attorney, Agent, or Firm*—Oliff & Berridge, PLC

(57) ABSTRACT

An optical measuring device includes: a screen having a reference line; a movable stage; an optical system for forming on the screen an optical image of a to-be-measured object placed on the stage; and an edge detecting sensor (112) for detecting a passage of a measurement edge of the optical image at an arbitrary position on the screen. The optical measuring device further includes: an offset value storage (143) storing a distance between the reference line and the edge detecting sensor (112) as an offset value; and a correction data calculator (144) for correcting measurement data measured with the reference line and the edge detecting sensor (112) by use of the offset value.

4 Claims, 4 Drawing Sheets

OPTICAL MEASURING MACHINE

BACKGROUND OF THE INVENTION

1. Field of the Invention

The present invention relates to an optical measuring machine having an optical system that forms on a screen an optical image of a to-be-measured object placed on a stage.

2. Description of Related Art

There has been known an optical measuring machine that irradiates illumination light to a to-be-measured object placed on a stage, magnifies and forms an optical image on a screen from light transmitted or reflected from the to-be-measured object, and measures a dimension and a profile of the to-be-measured object from the optical image magnified and formed on the screen.

In an optical measuring machine having a two-axis linear encoder on the stage, a measurement edge of the optical image of the to-be-measured object formed on the screen is matched to a reference point on the screen so as to read a two-dimensional coordinate of the stage at that time, and the dimension and the profile of the to-be-measured object is measured.

By using an edge detecting sensor provided on the screen for detecting a passage of the measurement edge of the optical image and a data processor for storing the two-dimensional coordinate of the stage when the measurement edge passes by the edge detecting sensor, the passage of the measurement edge can be automatically detected and the two-dimensional coordinate of the stage at that time can be read. Since the edge detecting sensor detects the measurement edge, the measurement data can be prevented from varying among operators depending on a sense of the operator.

There have been a variety of suggestions made from various viewpoints for the optical measuring machine having the edge detecting sensor. For instance, JP-A-3-35106 discloses that a plurality of edge detecting sensors are used in an optical measuring machine so as to shorten measurement time.

However, the optical measuring machine, in which the edge detecting sensor detects the passage of the measurement edge, may not be able to detect the measurement edge using the edge detecting sensor when the measurement edge is unclear or when a reflection measurement is performed.

Although, even in such cases, a measurement can be performed by visually matching the measurement edge of the optical image to the reference point on the screen so as to designate the measurement edge as described above, the following problem may occur.

The edge detecting sensor is generally provided at a position different from the reference point on the screen because the edge detecting sensor blocks the reference point from being visually observed when the edge detecting sensor is provided at the same position as the reference point. In this arrangement, an inconsistency may arise between visual-check measurement data and edge-detecting-sensor measurement data, the inconsistency corresponding to a distance between the reference point on the screen and the edge detecting sensor.

Accordingly, when a plurality of measurement edges are measured so as to obtain the dimension and the profile of the to-be-measured object, the whole measurement needs to be performed either by visual check or the edge detecting sensor, and it has not been possible to perform both a visual-check measurement and an edge-detecting-sensor measurement in one measurement.

SUMMARY OF THE INVENTION

An object of the present invention is to provide an optical measuring machine having an edge detecting sensor that can perform both a visual-check measurement and an edge-detecting-sensor measurement in one measurement.

An optical measuring machine according to an aspect of the present invention includes: a screen having a reference line; a movable stage; an optical system forming on the screen an optical image of a to-be-measured object placed on the stage; an edge detecting sensor detecting a passage of a measurement edge of the optical image at an arbitrary position on the screen; an offset value storage storing a distance between the reference line and the edge detecting sensor as an offset value; and a correction data calculator using the offset value and correcting measurement data measured with the reference line and the edge detecting sensor.

According to the aspect of the present invention, the optical measuring machine includes: the offset value storage that stores the distance between the reference line and the edge detecting sensor as the offset value; and the correction data calculator that uses the offset value and corrects the measurement data measured with the reference line and the edge detecting sensor. Accordingly, consistency between the visual-check measurement data and the edge-detecting-sensor measurement data is obtained.

Specifically, although an inconsistency corresponding to the distance between the reference line on the screen and the edge detecting sensor arises between the visual-check measurement data and the edge-detecting-sensor measurement data, the offset value storage stores the distance between the reference point and the edge detecting sensor as the offset value in advance while the correction data calculator reads the offset value from the offset value storage and subtracts the offset value from the visual-check measurement data or the edge-detecting-sensor measurement data. With this arrangement, the inconsistency between the measurement data is resolved and the consistency between the measurement data can be obtained.

Thus, the optical measuring machine having the edge detecting sensor can perform both a visual-check measurement and an edge-detecting-sensor measurement in one measurement.

According to the aspect of the present invention, it is preferable that, in the optical measuring machine, the reference line is provided by cross hairs formed of two straight lines orthogonally crossing with each other, and the offset value is stored as two-dimensional information of two directions along the two straight lines of the cross hairs.

According to the arrangement, in a two-dimensional measurement of a general XY coordinate, the inconsistency between the visual-check measurement data and the edge-detecting-sensor measurement data can be corrected and the consistency between the measurement data can be obtained. With this arrangement, it is possible to perform both a visual-check measurement and an edge-detecting-sensor measurement in one measurement.

According to the aspect of the present invention, it is preferable that the optical measuring machine further includes a measuring method designator that designates which is used, the reference line or the edge detecting sensor, for a measurement.

According to the arrangement, since whether to use the reference line or the edge detecting sensor for the measurement is designated so as to perform the measurement, an operator can determine whether to visually measure or to measure with the edge detecting sensor depending on a situation of each measurement edge.

DETAILED DESCRIPTION OF PREFERRED EMBODIMENT(S)

Embodiments of an optical measuring machine according to the present invention will be described below with reference to drawings.

Figure 1:
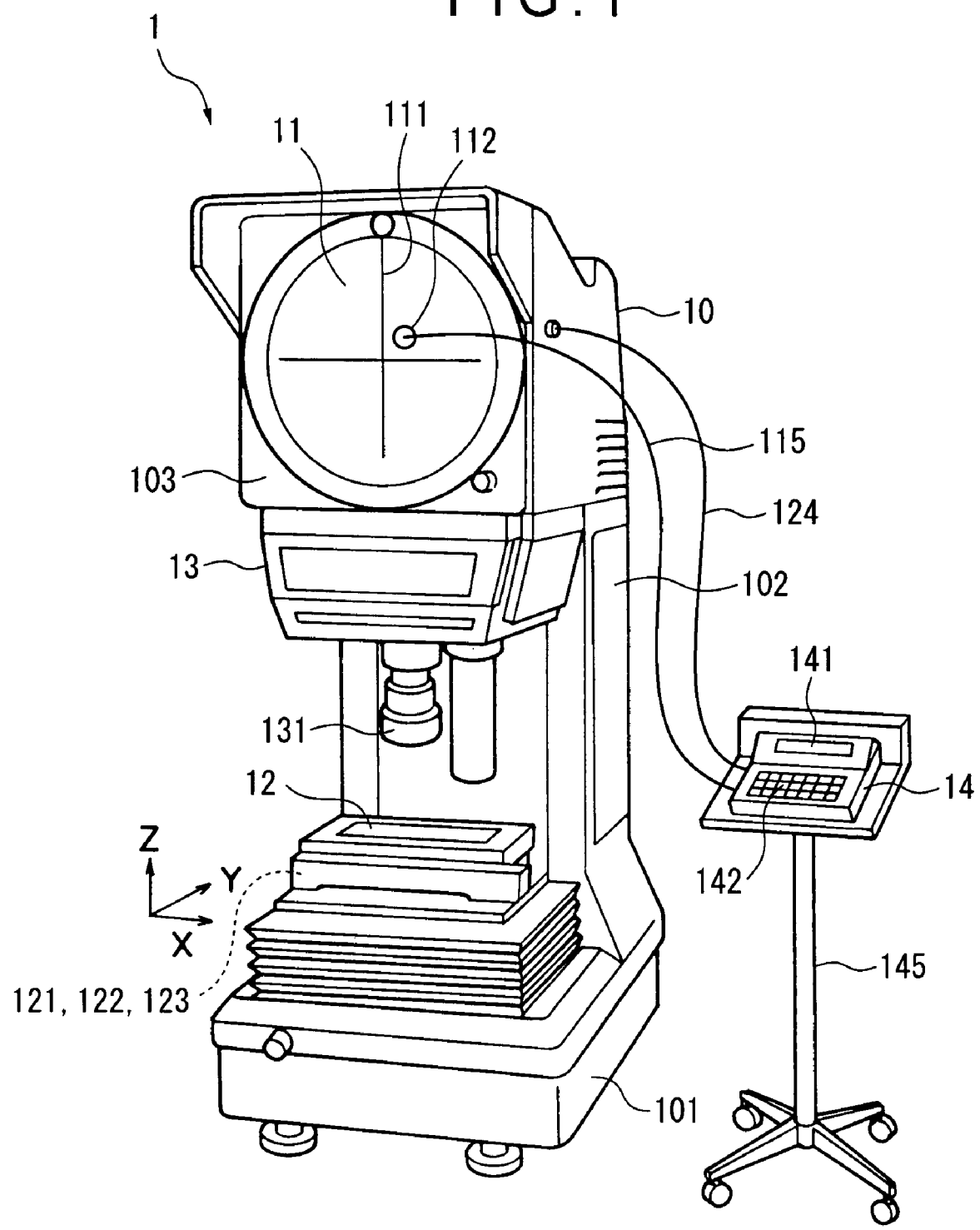
FIG. 1 is a perspective view showing an optical measuring machine according to an embodiment.

FIG. 1 is a perspective view showing an optical measuring machine 1 according to an embodiment.

As shown in FIG. 1, the optical measuring machine 1 includes: a body 10; a screen 11; a stage 12 on which a to-be-measured object is placed; a projector 13 having an optical system that irradiates light to the to-be-measured object and forms an optical image on the screen 11 based on the light; and a data processor 14.

The body 10 is provided by: a base 101 having the stage 12; a trunk portion 102 mounted on an end of an upper surface of the base 101; the screen 11 provided on a front upper portion of the trunk portion 102; and a head 103 having the projector 13.

The screen 11 is provided on a front surface of the head 103 of the body 10 and includes: cross hairs 111 as a reference line for a visual-check measurement; and an edge detecting sensor 112.

The cross hairs 111 are formed of two straight lines orthogonally crossing with each other at the center of the circular screen 11.

The columnar edge detecting sensor 112 housing an optical sensor detects a passage of a measurement edge of the optical image of the to-be-measured object formed on the screen 11, the edge detecting sensor detecting the passage at any arbitrary point on the screen 11. The edge detecting sensor 112 is fixed vertically to the screen 11 with one end abutting on the screen 11 while the other end being connected to the data processor 14 via a connection cable 115.

The edge detecting sensor 112 is provided at a position different from an intersecting point of the cross hairs 111. When the edge detecting sensor 112 is provided at the intersecting point of the cross hairs 111, the edge detecting sensor 112 blocks the intersecting point of the cross hairs 111 from being visually observed.

The stage 12 is provided on an upper surface of the base 101 of the body 10 so as to be movable in mutually orthogonal directions X, Y, Z, and houses three linear encoders 121, 122, 123 respectively detecting a movement of the stage 12 in the directions. The three linear encoders 121, 122, 123 are connected to the data processor 14 via a connection cable 124.

Note that an anteroposterior direction, a horizontal direction and a vertical direction in FIG. 1 respectively correspond to the direction Y, the direction X and the direction Z. On the screen 11, a horizontal direction corresponds to the direction X while a vertical direction corresponds to the direction Y.

The projector 13 is provided on a lower surface of the head 103 of the body 10 and includes an optical system 131. The optical system 131 irradiates light from a lower side of the stage 12 to the to-be-measured object placed on the stage 12 and forms the optical image of the to-be-measured object on the screen 11 based on the light transmitted therethrough.

The data processor 14 includes a display 141 and operation buttons 142. The display 141 displays measurement-concerning data such as a measurement result and an offset value. The operation buttons 142 as a measurement method designator are operated so as to determine whether to use the cross hairs 111 or the edge detecting sensor 112 for a measurement. Incidentally, the operation buttons 142 are not limited to the above use but may be used for other measurement operations. As described above, the data processor 14 is connected to the edge detecting sensor 112 via the connection cable 115 while being connected to the three linear encoders 121, 122, 123 via the connection cable 124. The code 145 represents a stand on which the data processor 14 is placed.

Figure 2:
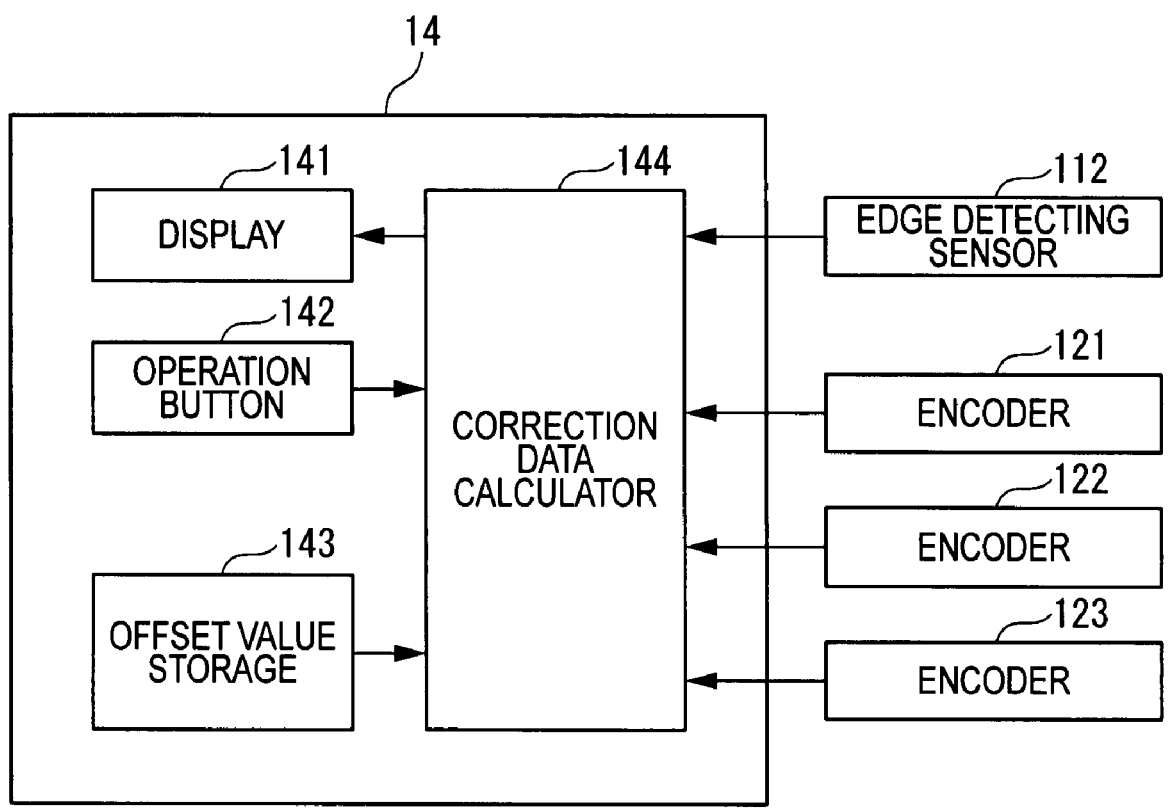
FIG. 2 is an illustration schematically showing an arrangement of a data processor according to the embodiment.

FIG. 2 is an illustration schematically showing an arrangement of the data processor 14. The data processor 14 includes an offset value storage 143 and a correction data calculator 144. The offset value storage 143 stores a distance between the intersecting point of the cross hairs 111 and the edge detecting sensor 112 as an offset value. The offset value is stored as two-dimensional information of the directions X and Y along the cross hairs 111. The correction data calculator 144 uses the offset value stored in the offset value storage 142 so as to correct measurement data measured with the cross hairs 111 and the edge detecting sensor 112.

Measuring operations using the optical measuring machine 1 will be described below, in which the measurement edge is designated based on detection results both by a visual check and the edge detecting sensor 112 so as to measure the dimension and the profile of the to-be-measured object.

(1) Calibration

Figure 3:
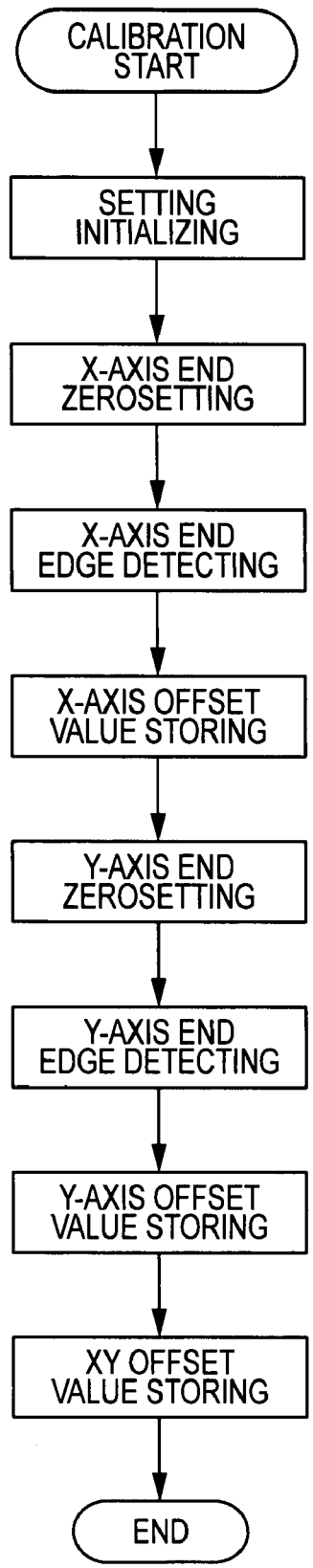
FIG. 3 is a diagram showing operational processes of a calibration according to the embodiment.

Before starting to measure, a calibration, i.e., storage of the offset value is performed. FIG. 3 shows operational processes of the calibration.

A rectangular reference to-be-measured object is placed on the stage 12. At this time, the reference to-be-measured object is placed such that sides of the reference to-be-measured object respectively are parallel to the directions X, Y, Z. The offset value in a previous measurement is deleted by operating the operation buttons 142 of the data processor 14 (setting initializing).

Next, the offset value in the direction X is measured and stored.

The stage 12 is moved in the direction X such that a side of the optical image of the reference to-be-measured object formed on the screen 11 coincides with the Y-direction line of the cross hairs 111. In this state, the operation buttons 142 of the data processor 14 are operated, such that an X-direction position of the stage at this time is stored as zero (X-axis end zerosetting).

Next, the same side of the optical image of the reference to-be-measured object is detected by the edge detecting sensor 112 (X-axis end edge detecting), and an X-direction position (a) of the stage at this time is stored in the offset value storage 143 (X-axis offset value storing).

Next, the offset value in the direction Y is measured and stored.

The stage 12 is moved in the direction Y such that a side of the optical image of the reference to-be-measured object formed on the screen 11 coincides with the X-direction line of the cross hairs 111. In this state, the operation buttons 142 of the data processor 14 are operated, such that a Y-direction position of the stage at this time is stored as zero (Y-axis end zerosetting).

Next, the same side of the optical image of the reference to-be-measured object is detected by the edge detecting sensor 112 (Y-axis end edge detecting), and a Y-direction position (b) of the stage at this time is stored in the offset value storage 143 (Y-axis offset value storing).

Following the above processes, the offset value (a, b) is stored (XY offset value storing). Incidentally, instead of following the above described processes, the offset value may be directly input to the data processor 14 by operating the operation buttons 142 and stored in the offset value storage 143.

(2) Measurement

Figure 4:
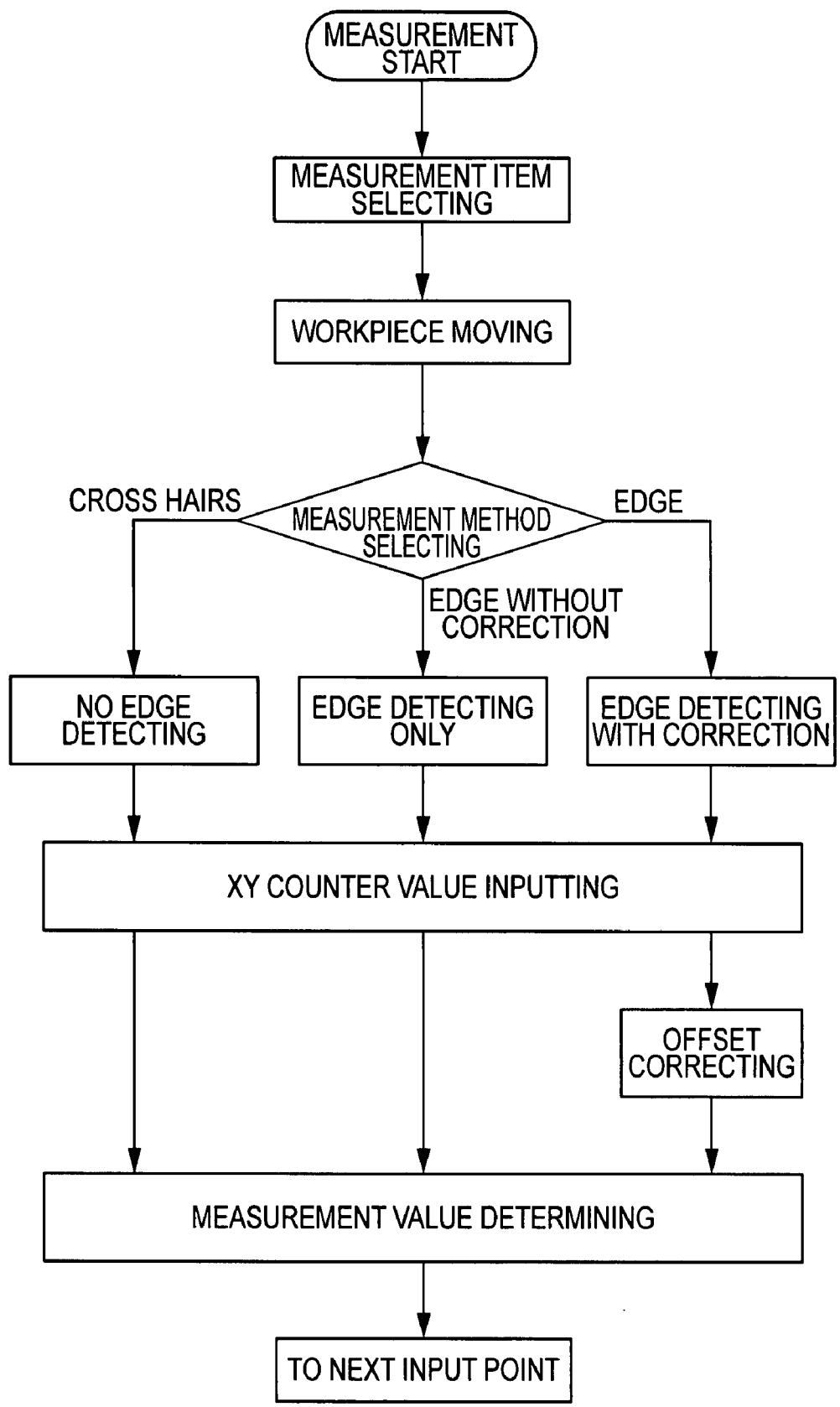
FIG. 4 is a diagram showing measurement processes using the optical measuring machine according to the embodiment.

FIG. 4 shows measurement processes.

First of all, the operation buttons 142 of the data processor 14 are operated, such that measurement items such as a dimension and a profile are selected (measurement item selecting).

The to-be-measured object is placed on the stage 12 and the stage 12 is moved such that the measurement edge of the optical image of the to-be-measured object formed on the screen 11 is moved to be close to the intersecting point of the cross hairs 111 or the edge detecting sensor 112 (to-be-measured object moving).

Whether with the cross hairs 111 or the edge detecting sensor 112 the measurement is performed is designated by operating the operation buttons 142 (measurement method selecting).

When the cross hairs 111 is used (no edge detecting), the correction data calculator 144 receives measurement data of the stage 12 position at this time from the three linear encoders 121, 122, 123 via the connection cable 124 (XY counter value inputting), and stores and outputs the measurement data as a measurement value (measurement value determining).

When the edge detecting sensor 112 is used (edge detecting with correction), the edge detecting sensor 112 detects the measurement edge. The correction data calculator 144 receives the measurement data of the stage 12 position at the time when the measurement edge is detected from the three linear encoders 121, 122, 123 via the connection cable 124 (XY counter value inputting), subtracts the offset value stored in the offset value storage 143 from the measurement data (offset correcting) and stores and outputs the subtracted result as a measurement value (measurement value determining).

When the whole measurement is performed by the edge detecting sensor 112, a measurement with the edge detecting sensor 112 without offset correction may be designated at the time of the measurement item selection (edge detecting only). In the above case, although the XY counter value input is performed similarly as described above, no offset correction is performed and the measurement value is determined.

According to the present embodiment, the following advantages are obtained.

(1) The data processor 14 includes: the offset value storage 143 that stores the distance between the cross hairs 111 and the edge detecting sensor 112 as the offset value; and the correction data calculator 144 that uses the offset value and corrects the measurement data measured with the cross hairs 111 and the edge detecting sensor 112. Accordingly, consistency can be obtained between the visual-check measurement data and the edge-detecting-sensor-112 measurement data. In short, it is possible to perform both a visual-check measurement and an edge-detecting-sensor-112 measurement in one measurement.

(2) Since whether to use the cross hairs 111 or the edge detecting sensor 112 for the measurement can be designated, a measurer can determine whether to visually measure or to measure with the edge detecting sensor 112 depending on a situation.

(3) Since the offset value can be directly input into the data processor 14 and stored in the offset value storage 143, the calibration can be omitted, thereby shorting the measurement time. For instance, when a measurement accuracy is not required, an approximate position of the edge detecting sensor 112, which is measured with a scale, may be used as the offset value, thereby simplifying the measurement.

(4) When the whole measurement is performed by the edge detecting sensor 112, a measurement with the edge detecting sensor 112 without offset correction may be designated at the time of the measurement item selection. Accordingly, a measurement can be performed similarly as in a conventional optical measuring machine.

Note that the present invention is not limited to the above embodiment, but includes other arrangements and the like as long as objects of the present invention can be achieved, and the following modifications may be included in the present invention.

(i) In the above-described embodiment, the process to designate the measuring method per measurement is shown, but the present invention is not limited thereto. For instance, when no measuring method is designated, a measurement may be automatically performed in accordance with the same measuring method as a previous measurement. Such an arrangement can omit the process to designate the measuring method each time when the measurement is performed in accordance with the same method several times, thereby shortening the measurement time.

(ii) Although, in the calibration according to the above embodiment, the zerosetting process is visually performed and the detecting process of the reference to-be-measured object is subsequently performed by the edge detecting sensor 112, the processes may be performed in the other way around. Specifically, after the zerosetting process is performed by the edge detecting sensor 112, the detecting process of the reference work may be visually performed. In the measurement performed in this manner, the offset value is subtracted from the measurement data obtained with the cross hairs 111 so as to be used as the measurement value and the measurement data obtained with the edge detecting sensor 112 is used as the measurement value as it is.

(iii) The optical measuring machine 1 is not limited to the profile and arrangement disclosed in the above embodiment.

Although the above embodiment uses, for example, the optical measuring machine 1 in which the stage 12 is moved, the projector 13 may be moved while the stage 12 is fixed in the optical measuring machine 1.

In addition, although the data processor 14 is separated from the body 10 of the optical measuring machine 1 in the above embodiment, the body 10 may house the data processor 14 inside. In this case, there is an advantage, for example, that the stand 145 may not be provided.

The priority application Number JP 2006-205243 upon which this patent application is based is hereby incorporated by reference.

What is claimed is:

1. An optical measuring machine, comprising:
a screen having a reference line;
a movable stage;

an optical system forming on the screen an optical image of a to-be-measured object placed on the stage;

an edge detecting sensor detecting a passage of a measurement edge of the optical image at an arbitrary position on the screen;

an offset value storage storing a distance between the reference line and the edge detecting sensor as an offset value; and a correction data calculator using the offset value and correcting measurement data measured with the reference line and the edge detecting sensor.

2. The optical measuring machine according to claim 1, wherein the reference line is provided by cross hairs formed of two straight lines orthogonally crossing with each other, and the offset value is stored as two-dimensional information of two directions along the two straight lines of the cross hairs.

3. The optical measuring machine according to claim 1, wherein the optical measuring machine further comprises a measuring method designator that designates which is used, the reference line or the edge detecting sensor, for a measurement.

4. The optical measuring machine according to claim 2, wherein the optical measuring machine further comprises a measuring method designator that designates which is used, the reference line or the edge detecting sensor, for a measurement.

* * * * *